United States Patent
Kelsch et al.

[11] Patent Number: 5,692,794
[45] Date of Patent: Dec. 2, 1997

[54] REMOVABLE COMBINATION SHELL AND CARPET KIT FOR PICKUP TRUCK

[75] Inventors: David Kelsch, Herriman; David Crismon, Pleasant Grove; Chance K. Ewing, West Jordan; Monty K. Kelsch, Sandy, all of Utah

[73] Assignee: Hydrapak Aerospace, Inc., West Jordon, Utah

[21] Appl. No.: 497,937

[22] Filed: Jul. 3, 1995

[51] Int. Cl.⁶ .................................................. B60P 3/32
[52] U.S. Cl. ...................... 296/164; 296/100; 296/39.2
[58] Field of Search ................................ 296/164, 156, 296/167, 39.2, 100, 24.1; 417/522

[56] References Cited

U.S. PATENT DOCUMENTS

| | | |
|---|---|---|
| D. 248,386 | 7/1978 | Hefner . |
| 3,217,914 | 11/1965 | Aldropp ........................ 296/164 X |
| 3,471,045 | 10/1969 | Panciocco . |
| 3,547,480 | 12/1970 | Ward ............................. 296/164 |
| 3,567,271 | 3/1971 | Gostomski ..................... 296/164 |
| 4,141,581 | 2/1979 | Tobin . |
| 4,629,390 | 12/1986 | Burke . |
| 4,681,360 | 7/1987 | Peters et al. . |
| 4,824,158 | 4/1989 | Peters et al. . |
| 4,830,242 | 5/1989 | Painter ....................... 296/37.6 X |
| 4,832,396 | 5/1989 | Moreno et al. ................. 296/164 |
| 4,875,731 | 10/1989 | Ruiz ............................ 296/39.2 X |
| 4,909,558 | 3/1990 | Roshinsky . |
| 4,993,088 | 2/1991 | Chudik ........................ 414/522 X |
| 5,083,830 | 1/1992 | Mucher et al. . |
| 5,090,335 | 2/1992 | Russell ........................ 414/522 X |
| 5,154,478 | 10/1992 | Erickson et al. . |
| 5,288,124 | 2/1994 | Ward ........................... 296/39.2 X |

FOREIGN PATENT DOCUMENTS 2215973  10/1976  Germany .......................... 296/167

*Primary Examiner*—Joseph D. Pape
*Attorney, Agent, or Firm*—Thorpe, North & Western, L.L.P.

[57] ABSTRACT

Apparatus comprising a combination pickup shell and carpet kit that can be loaded or unloaded in minutes by a one person is described. The apparatus comprises a pickup shell and a bed insert coupled together, with front and rear pairs of collapsible legs and a mechanism for moving the apparatus forward and rearward on the bed of the pickup truck disposed on the bed insert. Mechanisms for holding and maintaining the apparatus on the pickup bed are also described.

26 Claims, 5 Drawing Sheets

REMOVABLE COMBINATION SHELL AND CARPET KIT FOR PICKUP TRUCK

BACKGROUND OF THE INVENTION

This invention relates to a shell for covering the bed of a pickup truck. More particularly, this invention relates to a combination shell and carpet kit/bed insert that can be easily loaded onto and unloaded from a bed of a pickup truck and provides an enclosed space for seating, sleeping, or transporting people or goods.

Pickup trucks are a very popular form of transportation in the U.S., where it is estimated that more than one million new pickup trucks are sold each year. Reasons for this popularity include their versatility for transporting people as well as cargo. Standard pickup trucks, however, generally have only one bench seat, thus providing seating for only about three people. Extended cab designs have an extra bench seat that provides room for additional passengers. The open bed of a pickup truck is advantageous for hauling relatively large items, but fails to cover the cargo area, thus exposing the bed and cargo to the elements and providing a security risk for anything carried on the truck bed. For these reasons, many owners of pickup trucks purchase after market shells, i.e. thin, light weight coverings that are molded or shaped to fit over the bed, to provide protection and/or security. It is estimated that about 30% of pickup owners use such shells.

Another after market addition to many pickups with shells is what is known as a "carpet kit." A carpet kit includes a framework covered with carpeting or other material that is placed in the bed of a pickup to provide benches for seating additional passengers. Carpet kits are sold separately from shells, but are usually used together with pickup shells so that the bench seats of the carpet kit are covered by the shell.

Removing pickup shells and carpet kits so that the pickup bed can be used for carrying cargo is currently an awkward and time consuming process. Pickup shells and carpet kits typically are heavy and are shaped such that they are difficult to lift and carry by one person. Once pickup shells and carpet kits are removed from the pickup bed, they take up a considerable amount of storage space and cannot be easily moved. Replacing shells and carpet kits in a pickup bed also requires considerable exertion and time.

In view of the foregoing, it will be appreciated that a carpet kit/bed insert, to be used in combination with a pickup shell, that can be removed from a pickup bed by one person in a few minutes, stored, and easily and quickly replaced in the pickup bed would be a significant advancement in the art.

OBJECTS AND SUMMARY OF THE INVENTION

It is an object of the present invention to provide a combined pickup shell and carpet kit/bed insert for placing in the bed of a pickup truck and providing an enclosed seating, sleeping, and/or cargo space.

It is also an object of the invention to provide a combined pickup shell and carpet kit/bed insert for a pickup truck that can be easily removed from and replaced on the pickup bed.

It is another object of the invention to provide a combined pickup shell and carpet kit/bed insert for a pickup truck that is easily portable when not on a pickup bed.

It is a further object of the invention to provide a carpet kit/bed insert for coupling to a pickup shell such that the combined pickup shell and bed insert is easily removed from and replaced on the bed of a pickup truck.

These and other objects are achieved by providing an apparatus for enclosing an open bed of a pickup truck, the pickup bed containing a generally rectangular floor and upwardly extending parallel sidewalls and a front wall, the walls terminating in a coplanar top rail, comprising:

(a) a shell comprising a generally rectangular top with contiguous downwardly extending front, side, and rear walls disposed thereon, wherein the front and side walls contain substantially coplanar bottom edges;

(b) a bed insert comprising a bottom with contiguous upwardly extending front and side walls disposed thereon, wherein the front and side walls extend sufficiently upward to be disposed above the top rail of said pickup bed when inserted therein and contain substantially coplanar top edges, the shell and bed insert being sized such that, when brought together, the top edges of the walls of said bed insert engage the bottom edges of the walls of the shell to form a continuous seam thereby defining an interior compartment enclosing the pickup bed;

(c) means for securing the shell to the bed insert;

(d) front and rear pairs of collapsible legs disposed on the bed insert to pivot downwardly; and (e) moving means connected to the bottom of the bed insert for moving the apparatus forward and rearward on the floor of the pickup bed. The collapsible legs also contain means for adjusting the length thereof for accommodating different heights of a pickup bed. The collapsible legs also preferably include wheels rotatably disposed thereon for moving the apparatus when it is not loaded on a pickup bed. Means for holding and maintaining the apparatus in position when loaded on the pickup bed are also included.

An apparatus for coupling to a pickup shell for enclosing an open bed of a pickup truck, the pickup bed containing a generally rectangular floor and upwardly extending parallel sidewalls and a front wall, the walls terminating in a coplanar top rail, and the shell comprising a generally rectangular top with contiguous downwardly extending front, side, and rear walls disposed thereon, wherein the front and side walls contain substantially coplanar bottom edges, comprises:

(a) a bed insert comprising a bottom with contiguous upwardly extending front and side walls disposed thereon, wherein the front and side walls extend sufficiently upward to be disposed above the top rail of the pickup bed when inserted therein and contain substantially coplanar top edges, the shell and bed insert being sized such that, when brought together, the top edges of the walls of the bed insert engage the bottom edges of the walls of the shell to form a continuous seam thereby defining an interior compartment enclosing the pickup bed;

(b) means for securing the shell to the bed insert;

(c) front and rear pairs of collapsible legs disposed on the bed insert to pivot downwardly; and (d) moving means connected to the bottom of the bed insert for moving the apparatus forward and rearward on the floor of the pickup bed.

DETAILED DESCRIPTION OF THE INVENTION

Before the present apparatus containing a combined pickup shell and carpet kit/bed insert is disclosed and described, it is to be understood that this invention is not limited to the particular configurations, process steps, and materials disclosed herein as such process steps and materials may vary somewhat. It is also to be understood that the terminology employed herein is used for the purpose of describing particular embodiments only and is not intended to be limiting since the scope of the present invention will be limited only by the appended claims and equivalents thereof.

In describing and claiming the present invention, the following terminology will be used in accordance with the definitions set out below.

As used herein, "pickup truck," "pickup," "truck," and similar terms are used interchangeably to mean a light truck with an open body and low sides.

As used herein, "shell," "pickup shell," "camper shell," and similar terms are used interchangeably to mean a molded or shaped top adapted to fit over and enclose the bed of a pickup truck, thereby creating an enclosed space.

As used herein, "carpet kit," "bed insert," and similar terms are used interchangeably to mean a removable device adapted to fit into the bed of a pickup truck and that optionally contains seating and/or sleeping space for passengers or storage space for goods. A bed insert will typically have exterior dimensions designed to fit between the low walls of the pickup bed.

As used herein, "bed," "pickup bed," and similar terms mean the open body including low walls designed for carrying cargo in a pickup truck. Such a pickup bed generally comprises a floor, front wall, side walls, and tailgate. The sidewalls are generally parallel to each other as are the front wall and tailgate thereby surrounding and defining a rectangular floor. The upper surfaces of the front wall, sidewalls and tailgate are in the same generally horizontal plane, i.e. are coplanar, when the tailgate is in an upright or closed position.

Figure 1:
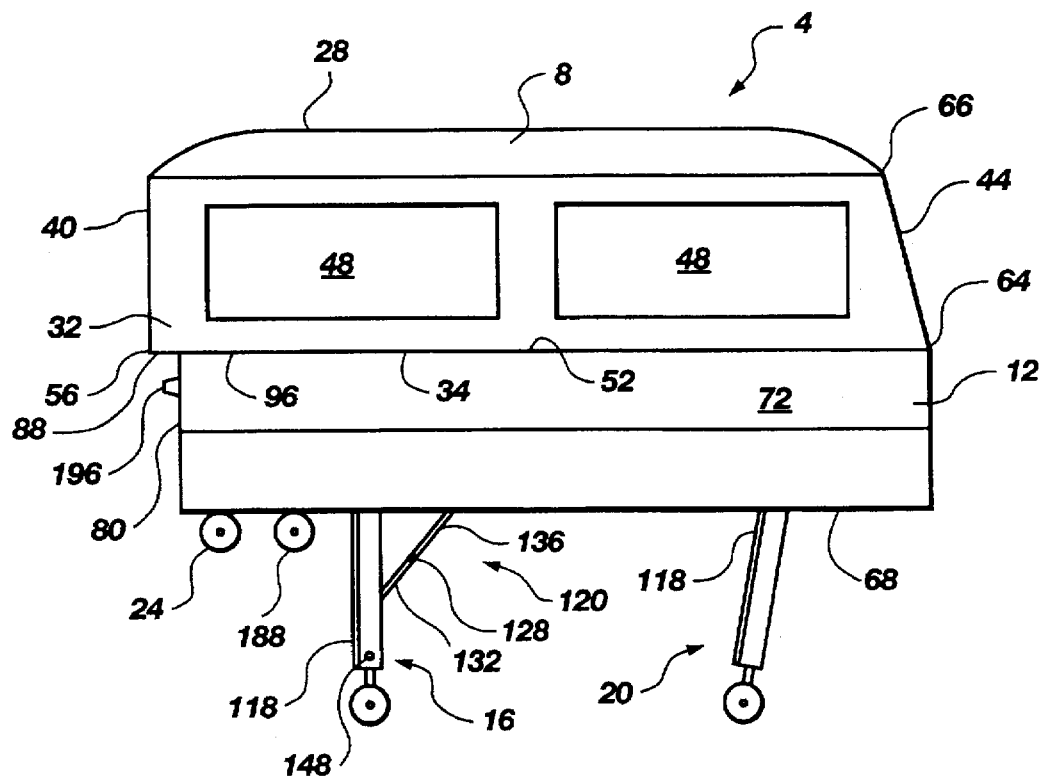
FIG. 1 shows an elevation side view of an illustrative embodiment of the apparatus according to the present invention.
Figure 2:
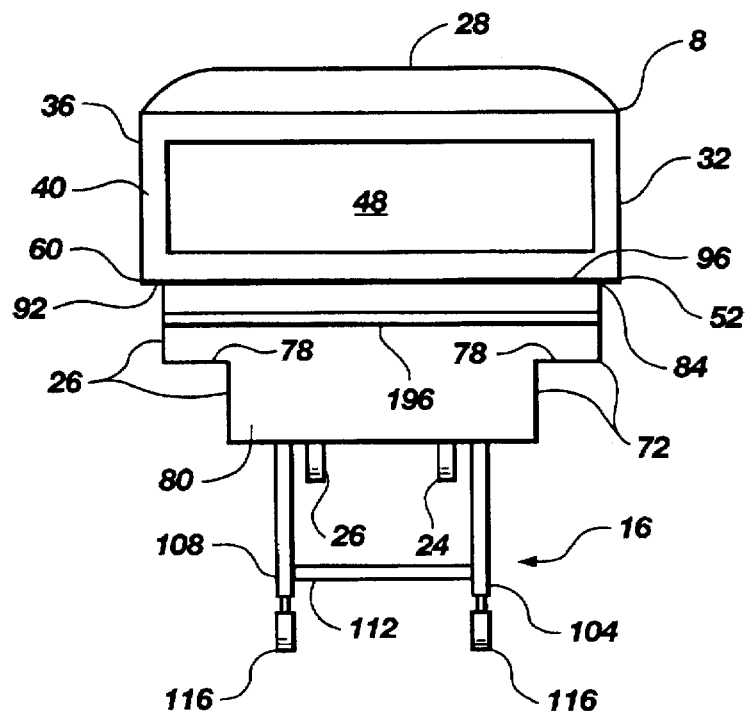
FIG. 2 shows an elevation front view of the apparatus of FIG. 1.
Figure 3:
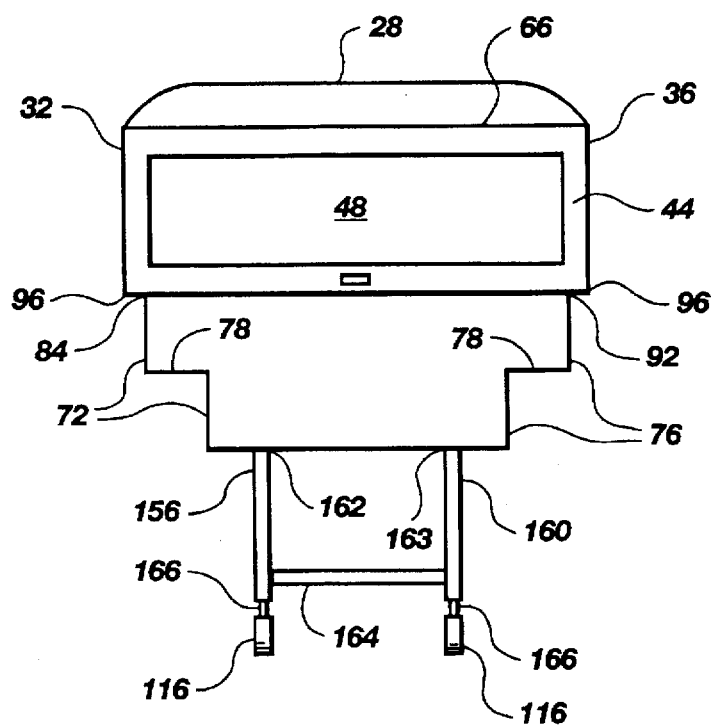
FIG. 3 shows an elevation rear view of the apparatus of FIG. 1.

Referring to FIGS. 1-3, there is shown an apparatus 4 comprising a pickup shell 8, a bed insert 12, front and rear pairs of collapsible legs 16 and 20, and means for moving the apparatus on the pickup bed (wheels 24 and 26). The pickup shell 8 comprises a top 28 with downwardly extending side walls 32 and 36, front wall 40, and rear wall 44 disposed thereon. Typically, at least one window 48 is integrally built into each of the side 32 and 36, front 40, and rear 44 walls, although such windows 48 are optional. Each of the side 32 and 36, front 40, and rear 44 walls contains a bottom edge 52, 56, 60, and 64 such that such bottom edges are substantially coplanar. The rear wall 44 is hinged by appropriate means (not shown) at its top edge 66 such that the rear wall 44 can pivot with respect to the top 28 of the pickup shell 8 to permit access to the interior of the apparatus 4.

The bed insert 12 comprises a bottom 68 with generally parallel upwardly extending sidewalls 72 and 76, and front 80 walls disposed thereon. The sidewalls 72 and 76, are preferably shaped with recesses 78 on a lower portion thereof to permit positioning of the apparatus between the wheel wells that commonly extend into the truck bed. Such recesses can be used for forming benches in the interior compartment of the apparatus. Each of the sidewalls 72 and 76 and front wall 80 contains a top edge 84, 88, and 92 such that such top edges 84, 88, and 92 are substantially coplanar. The bed insert 12 could also include a back wall, having a top edge substantially coplanar with the top edges 84, 88, and 92, but access to the interior of the apparatus 4 is made easier by omission of such a back wall.

Figure 4:
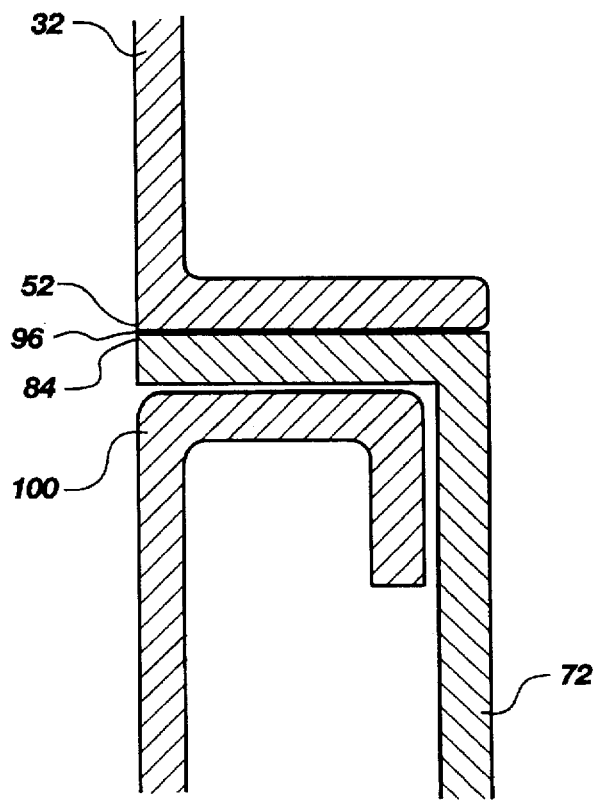
FIG. 4 shows a sectional view of the seam joining the shell and bed insert, of the invention, positioned above the top rail of the bed of a pickup truck.
Figure 7:
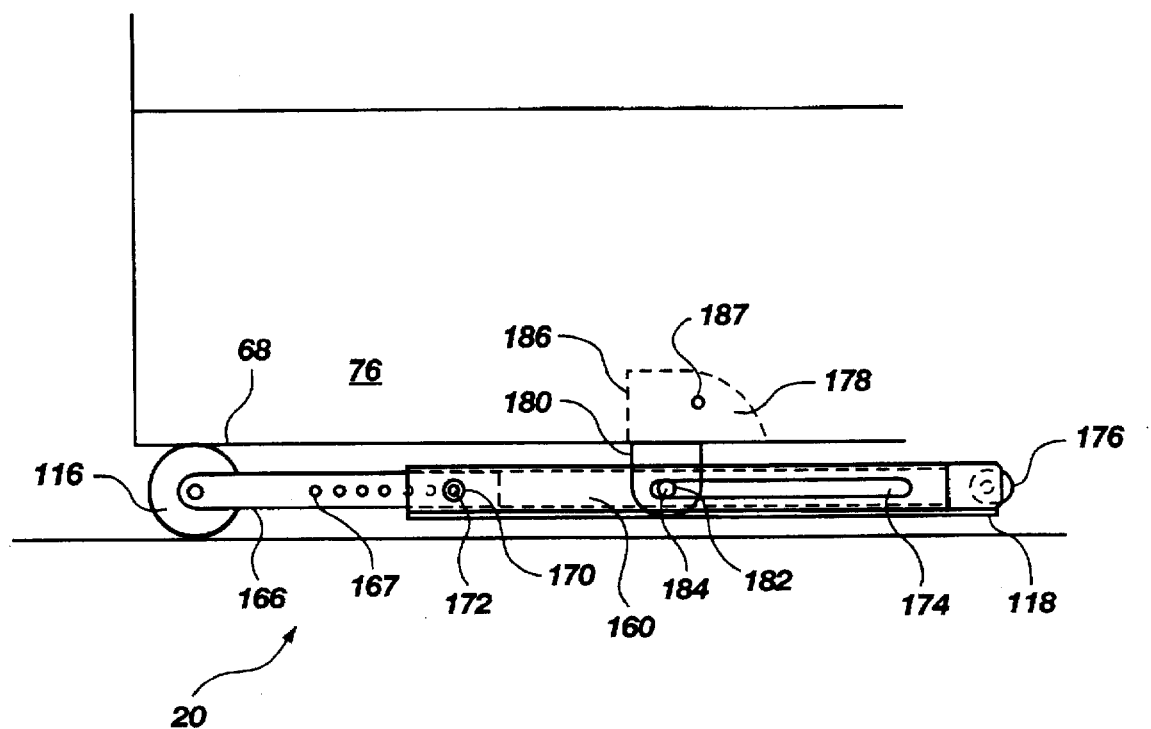
FIG. 7 shows the leg of FIG. 6 in a collapsed position.

The bottom edges 52, 56, and 60 of the left side wall 32, front wall 40, and right side wall 36 of the pickup shell 8 are coupled to the respective top edges 84, 88, and 92 of the left side wall 72, front wall 80, and right side wall 76 of the bed insert 12 such that a substantially coplanar, continuous seam 96 is formed that extends around the left side, front, and right side of the apparatus 4. When the apparatus 4 in properly positioned on the bed of a pickup truck, this seam 96 lies above the top rail 100 formed by the coplanar top edges of the side and front walls of the pickup bed (FIG. 4). The seam 96 can contact the top rail 100 of the pickup bed and thus at least partially support the apparatus 4 when properly positioned on the pickup bed. Some users of pickups, however, prefer that such apparatus not contact the top rail because of the potential for scratches or other damage to the paint on the top rail. Hence, stating that the seam lies "above" the top rail includes the situation where the seam lies on the top rail in direct contact therewith (FIG. 4), as well as the situation where the seam and top rail are spaced apart to prevent damage to the top rail (FIG. 7). Optionally, a spacer 102 (FIG. 7) can be disposed between the seam 96 and the top rail 100 to prevent damage to the top rail. Such a spacer 102 can be made of high molecular weight polyethylene or other suitable material, and can be glued or otherwise suitably attached to either the seam or the top rail. This spacer 102 can also be a softer plastic or foam rubber that can serve as a shock absorber between the seam and the truck bed.

Figure 5:
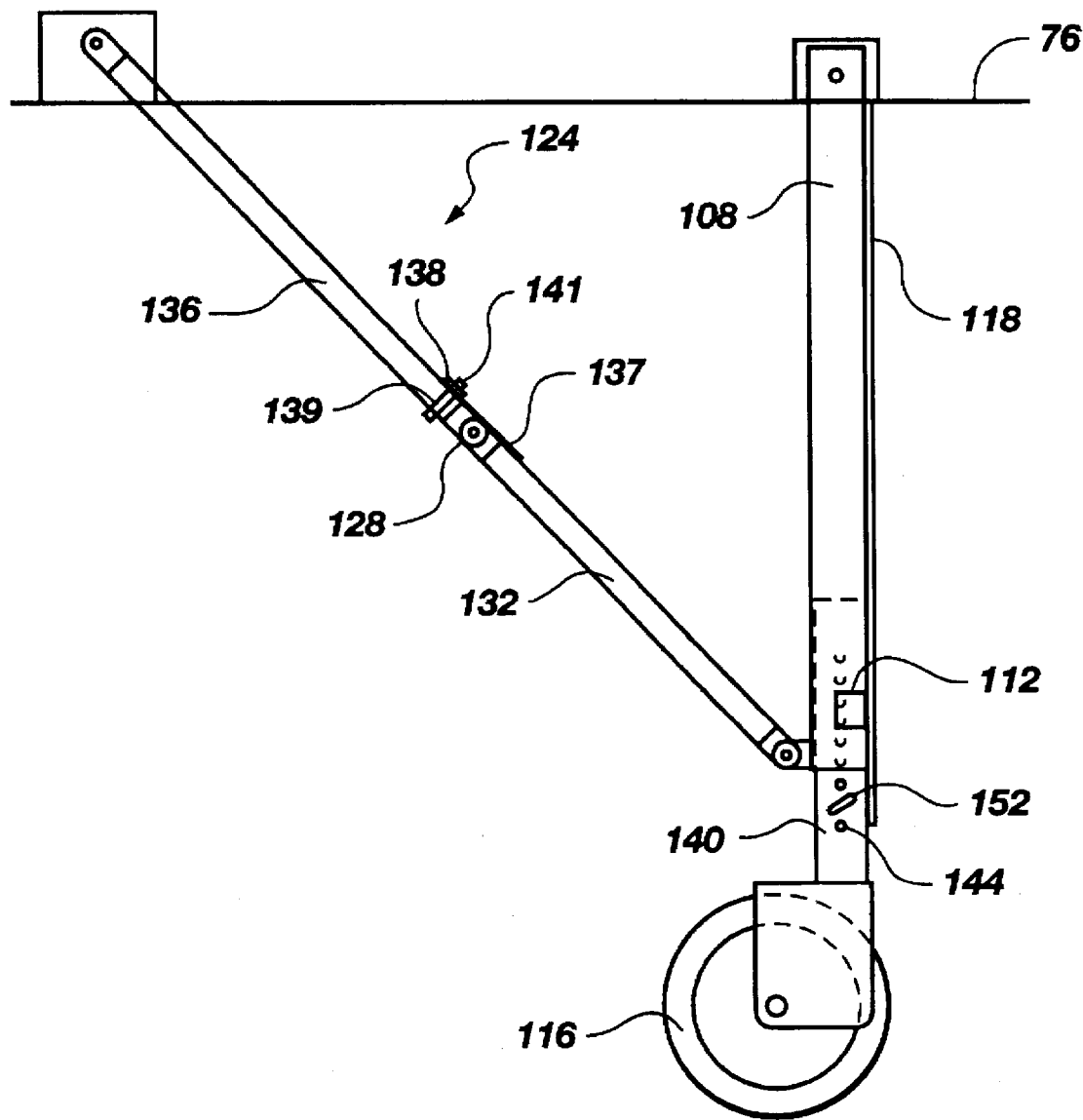
FIG. 5 shows a side elevation view of a front collapsible leg disposed on the bed insert, including means for adjusting the length of the leg and a diagonal support.

Pivotally disposed on the bed insert 12 are two pairs of collapsible legs 16 and 20. The front pair of legs 16 comprises a left hollow leg 104 and a right hollow leg 108 interconnected by a cross bar 112. Slidably disposed in each hollow leg 104 and 108 is a slidable leg 140 having a wheel 116 rotatably disposed on the distal end thereof (FIG. 5). The slidable leg 140 contains a linear series of holes 144 therein. Each leg 104 and 108 also contains a hole 148 adapted for permitting a pin 152 to slidably engage therein. Advantageously, the height of the bed insert 12 above the ground is selectable by sliding the slidable leg 140 inside the hollow leg, e.g. leg 104, until a selected length is obtained. The pin 152 is then inserted into hole 148 and through one of the holes 144 in the slidable leg 140, thus preventing the slidable leg 140 from sliding with respect to the hollow leg 104. The length of the leg 16, and thus the height of the bed insert 12 above the ground, is adjusted by removing the pin 152, sliding the slidable leg 140 with respect to the leg 104, and reinserting the pin 152 through hole 148 and a selected hole 144 in the slidable leg 140.

The proximal end of each of the legs 104 and 108 is pivotally coupled to the bed insert 12, preferably either to the bottom 68 (FIGS. 1-2) or side walls 72 and 76 (FIG. 5) thereof. Preferably, a slide strip 118 is disposed on the front of each of the legs 104 and 108 to protect the legs and pickup bed from damage and to facilitate sliding of the legs over the surface of the tailgate and pickup bed during loading and unloading of the apparatus 4 on the bed of the pickup. Slide strips made of a high molecular weight polyethylene or a similar material provides the necessary durability and contributes to a relatively low coefficient of kinetic friction between the slide strip 118 and the bed of the pickup. A diagonal support 120 and 124, best shown by 124 in FIG. 5, is pivotally disposed at one end thereof to a respective leg 104 and 108 and at the other end thereof to the bed insert 12. Each diagonal support contains a lockable pivot 128 connecting distal 132 and proximal 136 arms thereof. The lockable pivot 128 can be locked such that the diagonal supports 120 and 124 are in an extended position for supporting the legs 104 and 108 in a position for bearing the weight of the apparatus 4. The lockable pivot 128 can also be unlocked such that the distal 132 and proximal 136 arms pivot toward each other, thus allowing the legs 104 and 108 to pivot upward and rearward to a position substantially parallel and adjacent to the bottom 68 of the bed insert 12. An illustrative example of means for locking the lockable pivot includes a plate 137 fixedly disposed on the distal arm 132 and extending parallel to the longitudinal axis thereof to span a portion of the proximal arm 136. The plate 137 contains a hole 138 that is alignable with a hole 139 in the proximal arm 136. Placement of a pin 141 through holes 138 and 139 locks the lockable pivot 126 and prevents pivoting thereof. The lockable pivot 126 is unlocked by removing the pin 141.

Figure 6:
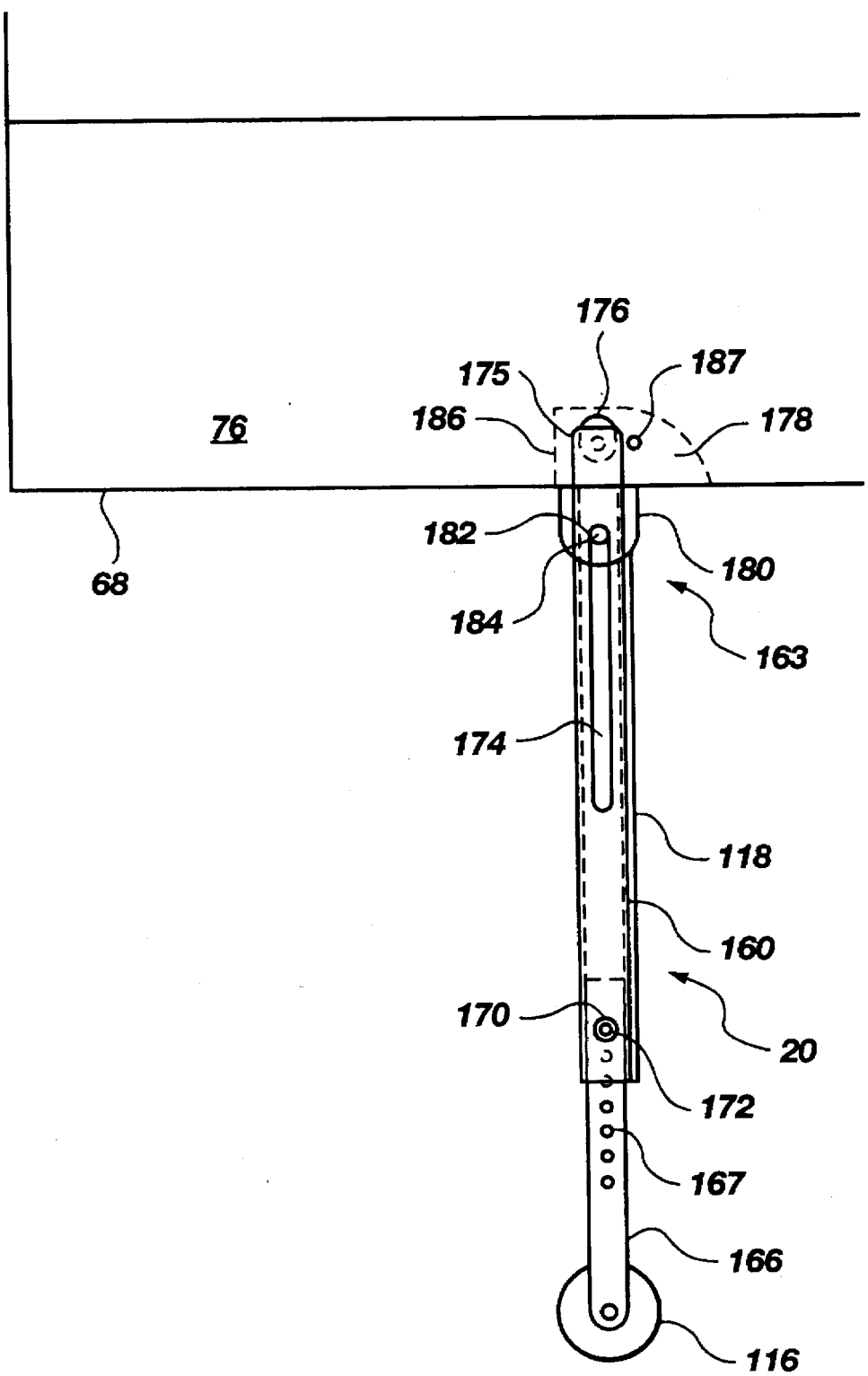
FIG. 6 shows a side elevation view of a rear collapsible leg disposed on the bed insert including means for adjusting the length thereof and stopping means to prevent pivoting of the leg.

Referring again to FIGS. 1-3, the rear pair of legs 20 comprises a left hollow leg 156 and a right hollow leg 160. pivotally disposed on the bed insert 12 at pivots 162 and 163. These legs 156 and 160 are interconnected by a cross bar 164. Slidably disposed in each of the hollow legs 156 and 160 is a slidable leg 166 having a wheel 116 rotatably disposed on the distal end thereof. FIG. 6 shows that the slidable leg 166 contains a series of holes 167 and the hollow legs 156 and 160 contain a hole 170 for receiving a pin 172 for adjusting the length of the legs 20 (FIG. 6). Preferably, a slide strip 118 is also disposed on the front surfaces of legs 156 and 160, as with the front pair of legs 16. Legs 156 and 160 pivot rearward to a position substantially parallel to and adjacent to the bottom 68 of the bed insert 12. The range of pivotal motion of legs 156 and 160 is limited to about 100°–110° by stopping means so that when the legs are positioned in their forwardmost position, the weight of the shell 8 and bed insert 12 is supported by both pairs of legs 16 and 20. The downward force of the weight of the shell 8 and bed insert 12 biases legs 156 and 160 against the stopping means, thus preventing the legs 156 and 160 from pivoting either forward or rearward.

An illustrative embodiment of such stopping means is shown in FIG. 6, using the right rear leg 160 as an example. Leg 160 contains a slot 174 through each of two opposing sides. At the proximal end 175 of leg 160, a small wheel 176 is rotatably coupled thereto. The bottom 68 of the bed insert 12 contains a knuckle 178 or recess for receiving the proximal end 175 of leg 160 including the wheel 176. The knuckle 178 recessed in the bottom of the bed insert has a substantially vertical rear wall 186, side walls each having a hole 187 therein for receiving a removable pin, and an arcuate top wall. A tab 180 extends downwardly from each side of the knuckle 178, the tab 180 having a hole 182 through which a pin 184 extends. The leg 160 is positioned between the tabs 180 with the pin 184 extending through the slot 174. The leg 160 can pivot about pin 184. When the proximal end 175 contacts the rear wall 186 of the knuckle 178, further rearward motion of the proximal end 175 is prevented. When the removable pin is in place in the holes 187, the proximal end 175 contacts the removable pin and is prevented t0 from further forward motion. When the removable pin is withdrawn from the holes 187 in the side walls of the knuckle 178, the proximal end 175 of leg 160 can pivot forward, with wheel 176 riding on the top wall of the knuckle 178 to facilitate pivoting, and the distal portion of leg 160 can pivot rearward. When leg 160 approaches being parallel to the bottom 68 of the bed insert 12, the proximal end 175 and wheel 176 exit the knuckle 178.

FIG. 7 shows the rear pair of legs 20 pivoted to a position substantially parallel and adjacent to the bottom 68 of the bed insert. In this position, the legs 20 can be pushed forward such that pin 184 slides in slot 174 until the legs 20 do not extend rearward of the bed insert, but are entirely beneath it. This permits closing of the tailgate of the pickup.

The means for moving the apparatus 4 on a pickup bed can comprise any appropriate means for rolling or sliding the apparatus 4 on the pickup bed. In the illustrative embodiment shown in FIGS. 1-2, the moving means 24 comprises a pair of wheels 24 and 26 rotatably mounted on the bottom 68 of the bed insert 12 near the front wall 80 thereof. Optionally, another pair of wheels 188 (FIG.1) can be mounted rearward of wheels 24 and 26 to partition the weight of the apparatus 4 on additional rollers and thus make it easier to move the apparatus 4 on the pickup bed.

Figure 8:
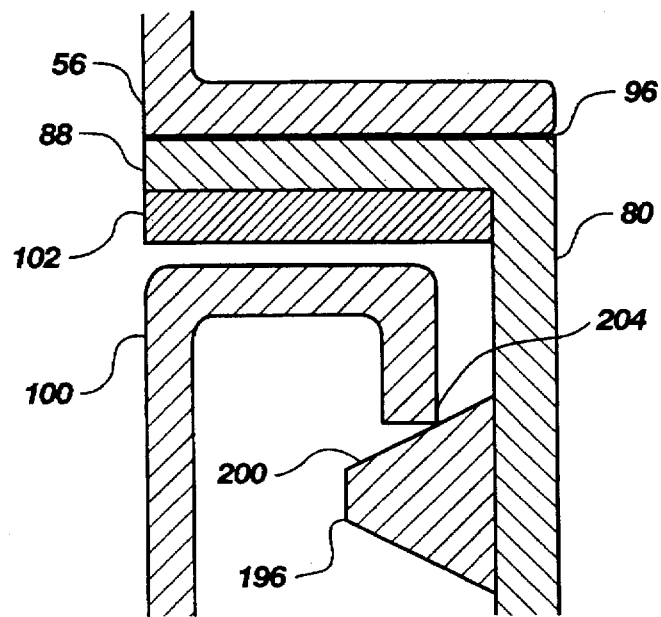
FIG. 8 shows a sectional view similar to FIG. 4 of means for holding and maintaining the apparatus in position over the top rail of the pickup bed.

Preferably, the apparatus 4 also contains means for holding and maintaining the apparatus 4 in position with the seam 96 above the top rail 100 of the pickup bed. FIGS. 1 and 8 illustrate an embodiment of such holding and maintaining means comprising a substantially horizontal rail 196 disposed on the front wall 80 of the bed insert 12. This rail 196 contains a diagonal contacting surface 200 positioned to contact the lower edge 204 of the top rail 100 of the pickup bed. Pushing the apparatus 4 toward the front of the truck causes the rail 196 to be wedged downwardly, thus holding and maintaining the seam 96 above the top rail 100 of the pickup bed. Additionally, clamps or buckles of the type used to close the lid of a toolbox can be used near the rear of the bed insert to hold and maintain the apparatus in position. Additional means for holding and maintaining the apparatus in position could be used and are considered within the scope of those skilled in the art.

The apparatus 4 is normally stored by positioning the two pair of legs 16 and 20 in an extended position, as shown in FIG. 1. The front pair of legs 16 is substantially perpendicular to the ground with the diagonal supports 120 and 124 extended and the lockable pivot 128 locked. The rear pair of legs 20 is positioned such that the wheels 116 are forward of the pivots 162 and 163 and the removable pins are inserted through holes 187 in the walls of the knuckles 178 (FIG. 6). Thus configured, the apparatus 4 is supported by the front and rear pairs of legs 16 and 20, and the apparatus can be rolled on a relatively smooth surface.

The apparatus 4 is loaded on the bed of a pickup truck by first lowering the tailgate to a position approximately coplanar with the floor of the truck bed. Next, the front of the apparatus is positioned at the rear of the truck with the longitudinal axis of the truck bed and the longitudinal axis of the apparatus 4 substantially coplanar and the wheels 24 and 26 just behind and above the tailgate. This position can be attained by rolling the apparatus 4, backing the truck, or a combination thereof. The apparatus 4 is then pushed toward the truck such that the wheels 24 and 26 contact the tailgate. By continuing to push the apparatus 4 toward the front of the truck, the wheels 24 and 26 roll on the tailgate and floor of the truck bed and support part of the weight of the apparatus 4. Pushing of the apparatus 4 toward the front of the truck is continued until the tailgate contacts the slide strips 118 on the front pair of legs 16. Then, the lockable pivot 128 is unlocked, thus permitting the distal arm 132 and proximal arm 136 of the diagonal supports 120 and 124 to pivot toward each other and the legs 104 and 108 to pivot rearward. The apparatus 4 is again pushed toward the front of the truck such that the wheels 24 and 26 continue to roll on the floor of the truck bed and the slide strip 118 on the front legs 104 and 108 slides against the tailgate, thus pushing the front legs 104 and 108 upward and rearward until the legs 104 and 108 reach a position substantially parallel to and adjacent to the bottom 68 of the bed insert 12. Continued pushing of the apparatus 4 toward the front of the truck results in the slide strip 118 of the rear pair of legs 20 contacting the tailgate. At this point, the to removable pins in holes 187 are removed, allowing legs 156 and 160 to pivot rearward and upward such that all the weight of the apparatus 4 is on the truck bed. The apparatus 4 is then pushed until the legs 156 and 160 reach a position substantially parallel to and adjacent to the bottom 68 of the bed insert and the seam 96 comes to rest above the top rail of the pickup bed 100, i.e. the apparatus is correctly positioned on the pickup bed. The rear legs 20 can then be pushed forward such that they do not extend rearward of the bed insert (FIG. 7). The means for holding and maintaining the apparatus in the pickup bed can then be employed, such as pushing the apparatus forward such that rail 196 is wedged downward under the top rail 100 of the pickup bed (FIG. 8) and clamping the additional clamps or buckles that are to be used. The tailgate can then be closed.

The apparatus according to the instant invention can be fabricated by coupling a commercially available pickup shell to a bed insert containing the two pairs of collapsible legs and means for moving the apparatus on the bed of the truck. Commercially available pickup shells are typically constructed of molded fiberglass or other similar strong, light material. The bed insert is constructed of similar materials. The interior portion of the bed insert preferably contains seats, such as benches, for a plurality of persons. Optionally, the interior portion of the bed insert can be configured to provide bed means for use in sleeping, or storage compartments for filing papers, work samples, or other materials. The seats can be covered with carpet or other suitable material. The pickup shell and bed insert are coupled together, such as with bolts. The collapsible legs and moving means are also bolted to the bed insert or otherwise joined thereto in an appropriate manner.

We claim:

1. An apparatus for enclosing an open bed of a pickup truck, said pickup bed containing a generally rectangular floor and upwardly extending parallel sidewalls and a front wall, said walls terminating in a coplanar top rail, comprising:

(a) a shell comprising a generally rectangular top with contiguous downwardly extending front, side, and rear walls disposed thereon, wherein said front and side walls contain substantially coplanar bottom edges;

(b) a bed insert comprising a bottom with contiguous upwardly extending front and side walls disposed thereon, wherein said front and side walls extend sufficiently upward to be disposed above the top rail of said pickup bed when inserted therein and contain substantially coplanar top edges, said shell and bed insert being sized such that, when brought together, the top edges of the walls of said bed insert engage the bottom edges of the walls of said shell to form a continuous seam thereby defining an interior compartment enclosing said pickup bed;

(c) means for securing said shell to said bed insert;

(d) front and rear pairs of collapsible legs pivotably disposed on said bed insert to; and (e) moving means connected to the bottom of said bed insert for moving said apparatus forward and rearward on the floor of said pickup bed.

2. The apparatus of claim 1 wherein said moving means comprises a plurality of wheels positioned to extend below the bottom of said bed insert at forward portion thereof such that said wheels rotatably contact the floor of said pickup bed when said apparatus is being positioned thereon.

3. The apparatus of claim 1 wherein said continuous seam lies directly above said top rail.

4. The apparatus of claim 1 wherein each said collapsible leg comprises means for adjusting the length thereof.

5. The apparatus of claim 4 wherein said length adjustment means comprises a hollow leg member having a wall with a hole therein, a slidable member slidably disposed in said hollow leg member, said slidable member having a wall containing a linear series of holes alignable with the hole in the wall of the hollow leg member, and a removable pin adapted for being inserted into the hole in the wall of the hollow leg member and a selected hole in the slidable member aligned therewith, thus preventing further sliding of the slidable member.

6. The apparatus of claim 1 wherein said collapsible legs comprise a forward surface with a slide strip disposed thereon.

7. The apparatus of claim 1 wherein each of said collapsible legs comprises a proximal end pivotally disposed on said bed insert and a distal end having a wheel rotatably disposed thereon.

8. The apparatus of claim 7 wherein each said front collapsible leg further comprises a diagonal support comprising a proximal arm and a distal arm joined by a lockable pivot, wherein said proximal arm is pivotally disposed on said bed insert and the distal arm is pivotally disposed on said front collapsible leg, wherein locking of said lockable pivot prevents pivoting of said proximal and distal arms, thereby preventing pivoting of said front collapsible leg.

9. The apparatus of claim 1 further comprising means for holding and maintaining the seam above the top rail of the pickup bed.

10. The apparatus of claim 9 wherein said holding and maintaining means comprises a rail disposed on the front wall of said bed insert, said rail containing wedge means for being wedged beneath said top rail of said pickup bed.

11. The apparatus of claim 7 wherein each said rear collapsible leg comprises means for stopping pivoting thereof.

12. The apparatus of claim 11 wherein said stopping means comprises a knuckle recessed in said bottom of the bed insert, said knuckle having a substantially vertical rear wall, side walls each having a hole therein for receiving a removable pin, and an arcuate top wall, and wherein each said collapsible leg comprises a proximal end extending into said knuckle such that when said removable pin is inserted through said holes the removable pin and the rear wall of the knuckle prevent pivoting of each said rear collapsible leg.

13. The apparatus of claim 1 wherein said pickup bed includes wheel wells extending thereinto and each of said side walls of said bed insert comprise a recessed lower portion for fitting between said wheel wells such that said recessed lower portion forms a bench in said interior compartment.

14. An apparatus for coupling to a pickup shell for enclosing an open bed of a pickup truck, said pickup bed containing a generally rectangular floor and upwardly extending parallel sidewalls and a front wall, said walls terminating in a coplanar top rail, and said shell comprising a generally rectangular top with contiguous downwardly extending front, side, and rear walls disposed thereon, wherein said front and side walls contain substantially coplanar bottom edges, comprising:

(a) a bed insert comprising a bottom with contiguous upwardly extending front and side walls disposed thereon, wherein said front and side walls extend sufficiently upward to be disposed above the top rail of said pickup bed when inserted therein and contain substantially coplanar top edges, said shell and bed insert being sized such that, when brought together, the top edges of the walls of said bed insert engage the bottom edges of the walls of said shell to form a continuous seam thereby defining an interior compartment enclosing said pickup bed;

(b) means for securing said shell to said bed insert;

(c) front and rear pairs of collapsible legs disposed on said bed insert and (d) moving means connected to the bottom of said bed insert for moving said apparatus forward and rearward on the floor of said pickup bed.

15. The apparatus of claim 14 wherein said moving means comprises a plurality of wheels positioned to extend below the bottom of said bed insert at a forward portion thereof such that said wheels rotatably contact the floor of said pickup bed when said apparatus is being positioned thereon.

16. The apparatus of claim 14 wherein said continuous seam lies directly above said top rail.

17. The apparatus of claim 14 wherein each said collapsible leg comprises means for adjusting the length thereof.

18. The apparatus of claim 17 wherein said length adjustment means comprises a hollow leg member having a wall with a hole therein, a slidable member slidably disposed in said hollow leg member, said slidable member having a wall containing a linear series of holes alignable with the hole in the wall of the hollow leg member, and a removable pin adapted for being inserted into the hole in the wall of the hollow leg member and a selected hole in the slidable member aligned therewith, thus preventing further sliding of the slidable member.

19. The apparatus of claim 14 wherein said collapsible legs comprise a forward surface with a slide strip disposed thereon.

20. The apparatus of claim 14 wherein each of said collapsible legs comprises a proximal end pivotally disposed on said bed insert and a distal end having a wheel rotatably disposed thereon.

21. The apparatus of claim 20 wherein each said front collapsible leg further comprises a diagonal support comprising a proximal arm and a distal arm joined by a lockable pivot, wherein said proximal arm is pivotally disposed on said bed insert and the distal arm is pivotally disposed on said front collapsible leg, wherein locking of said lockable pivot prevents pivoting of said proximal and distal arms, thereby preventing pivoting of said front collapsible leg.

22. The apparatus of claim 14 further comprising means for holding and maintaining the seam above the top rail of the pickup bed.

23. The apparatus of claim 22 wherein said holding and maintaining means comprises a rail disposed on the front wall of said bed insert, said rail containing wedge means for being wedged beneath said top rail of said pickup bed.

24. The apparatus of claim 20 wherein each said rear collapsible leg comprises means for stopping pivoting thereof.

25. The apparatus of claim 24 wherein said stopping means comprises a knuckle recessed in said bottom of the bed insert, said knuckle having a substantially vertical rear wall, side walls each having a hole therein for receiving a removable pin, and an arcuate top wall, and wherein each said collapsible leg comprises a proximal end extending into said knuckle such that when said removable pin is inserted through said holes the removable pin and the rear wall of the knuckle prevent pivoting of each said rear collapsible leg.

26. The apparatus of claim 14 wherein said pickup bed includes wheel wells extending thereinto and each of said side walls of said bed insert comprise a recessed lower portion for fitting between said wheel wells such that said recessed lower portion forms a bench in said interior compartment.

* * * * *